(12) United States Patent
Shirakami

(10) Patent No.: US 11,325,425 B2
(45) Date of Patent: May 10, 2022

(54) TYRE FOR A MOTORCYCLE FOR ROUGH TERRAIN

(71) Applicant: Sumitomo Rubber Industries, Ltd., Hyogo (JP)

(72) Inventor: Kazuya Shirakami, Hyogo (JP)

(73) Assignee: Sumitomo Rubber Industries, Ltd., Hyogo (JP)

(*) Notice: Subject to any disclaimer, the term of this patent is extended or adjusted under 35 U.S.C. 154(b) by 524 days.

(21) Appl. No.: 16/243,162

(22) Filed: Jan. 9, 2019

(65) Prior Publication Data
US 2019/0232727 A1 Aug. 1, 2019

(30) Foreign Application Priority Data
Jan. 31, 2018 (JP) .............................. JP2018-015491

(51) Int. Cl.
| | |
|---|---|
| *B60C 11/11* | (2006.01) |
| *B60C 11/13* | (2006.01) |
| *B60C 11/03* | (2006.01) |

(52) U.S. Cl.
CPC ........... *B60C 11/11* (2013.01); *B60C 11/0302* (2013.01); *B60C 11/1369* (2013.01); *B60C 2200/10* (2013.01); *B60C 2200/14* (2013.01)

(58) Field of Classification Search
None
See application file for complete search history.

(56) References Cited

U.S. PATENT DOCUMENTS

| | | | |
|---|---|---|---|
| 6,401,774 B1* | 6/2002 | Rooney | B60C 11/0302 152/209.12 |
| 2012/0018067 A1* | 1/2012 | Hikita | B60C 11/11 152/209.8 |
| 2014/0209227 A1* | 7/2014 | Maeda | B60C 11/11 152/209.22 |

(Continued)

FOREIGN PATENT DOCUMENTS

| | | |
|---|---|---|
| EP | 3098090 A1 | 11/2016 |
| JP | H08-332809 A | 12/1996 |

(Continued)

OTHER PUBLICATIONS

JP2010173459 Nakamura English Translation (Year: 2010).*

(Continued)

*Primary Examiner* — Jacob T Minskey
*Assistant Examiner* — Adrien J Bernard
(74) *Attorney, Agent, or Firm* — Studebaker & Brackett PC

(57) ABSTRACT

A tyre for a motorcycle for rough terrain comprises a tread portion. In a region between at least one of tread edges and a tyre equator, the tread portion is provided with middle blocks, shoulder blocks, and tie bars each connecting between one of the middle blocks and its adjacent one of the shoulder blocks. The shoulder blocks include first shoulder blocks forming the one of the tread edges and second shoulder blocks arranged on an inner side in a tyre axial direction of the one of the tread edges. The tie bars include first tie bars each connecting between one of the middle blocks and one of the first shoulder blocks and second tie bars each connecting between one of the middle blocks and one of the second shoulder blocks.

20 Claims, 6 Drawing Sheets

(56) References Cited

U.S. PATENT DOCUMENTS

2016/0214439 A1* 7/2016 Ogo ................. B60C 11/033
2016/0347123 A1* 12/2016 Abe ................. B60C 11/032

FOREIGN PATENT DOCUMENTS

JP          2010-173459  A     8/2010
JP          2017-121895  A     7/2017

OTHER PUBLICATIONS

The extended European search report issued by the European Patent Office dated Jun. 25, 2019, which corresponds to European Patent Application No. EP18213146.6-1012 and is related to U.S. Appl. No. 16/243,162.

* cited by examiner

TYRE FOR A MOTORCYCLE FOR ROUGH TERRAIN

TECHNICAL FIELD

The present invention relates to a tyre for a motorcycle, specifically a tyre for a motorcycle suitable for running on rough terrain.

BACKGROUND ART

Japanese Unexamined Patent Application Publication No. 2017-121895 (Patent Literature 1) has proposed a tyre for a motorcycle for rough terrain having a tread portion provided with middle blocks and shoulder blocks.

In a conventional tyre as disclosed in Patent Literature 1, a tread groove bottom surface between the middle blocks and the shoulder blocks tends to bend in a bow shape so as to be recessed toward a side of a tyre cavity during cornering with a relatively large camber angle. When cornering in such a state, stress concentrates at bases of the middle blocks and the shoulder blocks, therefore, these blocks tend to be damaged. Further, when the tread groove bottom surface is liable to bend as described above, steering response fed back to the rider changes suddenly when cornering at a large camber angle such that the shoulder blocks contact the ground, therefore, it is possible that steering stability is deteriorated.

SUMMARY OF THE INVENTION

The present invention was made in view of the above, and a primary object thereof is to provide a tyre for a motorcycle for rough terrain capable of exerting excellent block durability and steering stability.

In one aspect of the present invention, a tyre comprises a tread portion, wherein in a region between at least one of tread edges of the tread portion and a tyre equator, the tread portion is provided with a plurality of middle blocks arranged between the tyre equator and the one of the tread edges, a plurality of shoulder blocks arranged on an outer side in a tyre axial direction of the middle blocks, and tie bars each connecting between one of the middle blocks and its adjacent one of the shoulder blocks, the plurality of the shoulder blocks include first shoulder blocks whose outer ends in the tyre axial direction of ground contacting surfaces thereof form the one of the tread edges and second shoulder blocks whose outer ends in the tyre axial direction of ground contacting surfaces thereof arranged on an inner side in the tyre axial direction of the one of the tread edges, and the tie bars include first tie bars each connecting between one of the middle blocks and its adjacent one of the first shoulder blocks and second tie bars each connecting between one of the middle blocks and its adjacent one of the second shoulder blocks.

In another aspect of the invention, it is preferred that each of the second tie bars is connected with one of the middle blocks with which any of the first tie bars is not connected.

In another aspect of the invention, it is preferred that the tread portion is bound with an intended tyre rotational direction, and each of the first tie bars and the second tie bars is inclined toward a heel side in the tyre rotational direction as it goes from a side of the one of the tread edges to a side of the tyre equator.

In another aspect of the invention, it is preferred that each of the first tie bars and the second tie bars is inclined at an angle in a range of from 20 to 80 degrees with respect to a tyre circumferential direction.

In another aspect of the invention, it is preferred that the angle of each of the second tie bars is smaller than the angle of each of the first tie bars.

In another aspect of the invention, it is preferred that the tread portion is provided with a plurality of the first tie bars, and in at least one of the plurality of the first tie bars, a width in a direction perpendicular to a longitudinal direction thereof gradually increases from one of the middle blocks connected therewith to one of the first shoulder blocks connected therewith.

In another aspect of the invention, it is preferred that the tread portion is provided with a plurality of the second tie bars, and in at least one of the plurality of the second tie bars, a width in a direction perpendicular to a longitudinal direction thereof gradually decreases from one of the middle blocks connected therewith to one of the second shoulder blocks connected therewith.

In another aspect of the invention, it is preferred that a height of each of the tie bars is not more than 0.5 times a maximum height of each of the middle blocks.

In another aspect of the invention, it is preferred that each of the first tie bars and the second tie bars has a connecting portion with a respective one of the middle blocks, and a width of the connecting portion of each of the second tie bars is larger than a width of the connecting portion of each of the first tie bars.

In another aspect of the invention, it is preferred that the tread portion is bound with an intended tyre rotational direction, and each of the second tie bars is connected with a block wall on a heel side in the tyre rotational direction of a respective one of the second shoulder blocks.

In another aspect of the invention, it is preferred that a width of a connecting portion of each of the second tie bars with a respective one of the second shoulder blocks is in a range of from 0.30 to 0.70 times a width in the tyre axial direction of the block wall of a respective one of the second shoulder blocks.

DESCRIPTION OF THE PREFERRED EMBODIMENT

Figure 1:
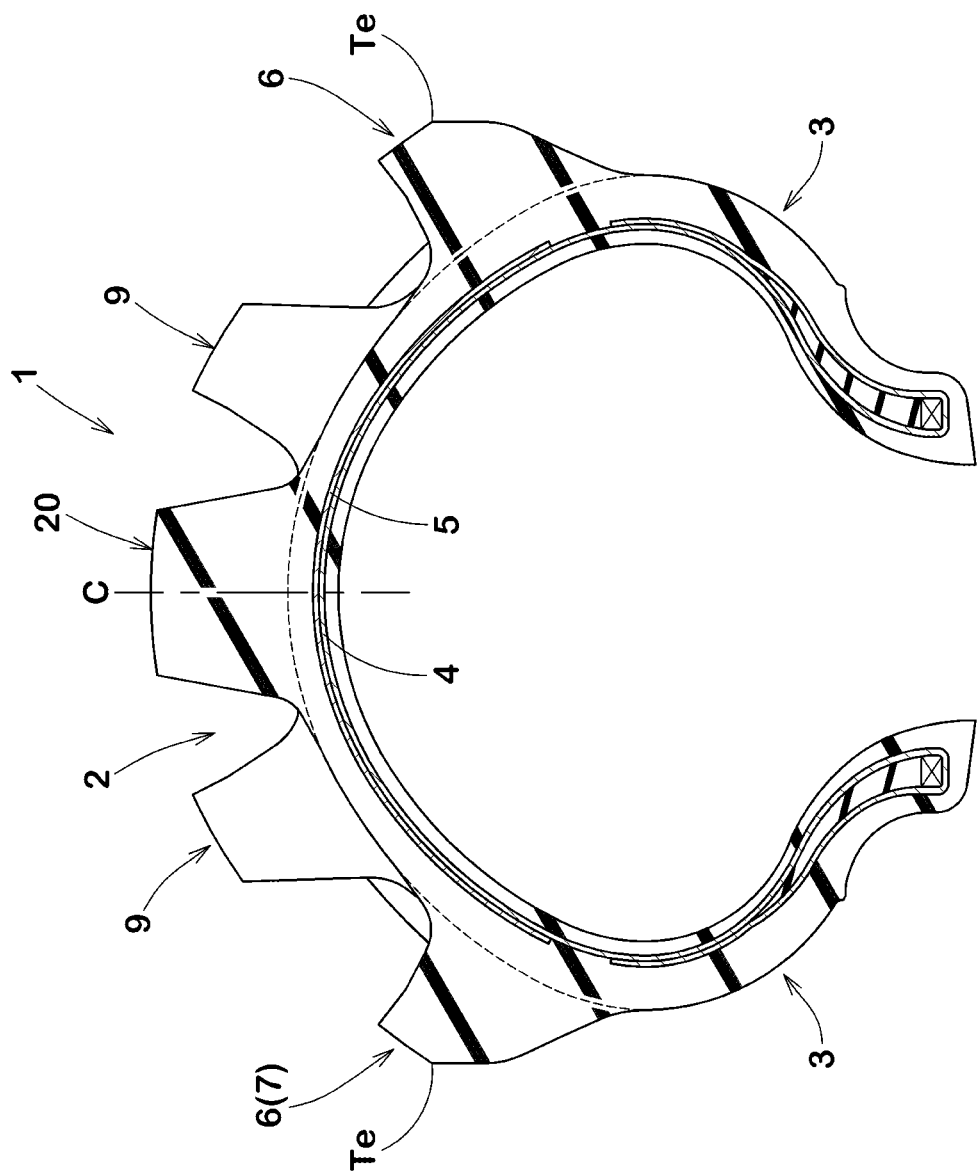
FIG. 1 is a lateral cross-sectional view of a tyre for a motorcycle for rough terrain showing an embodiment of the present invention.
Figure 2:
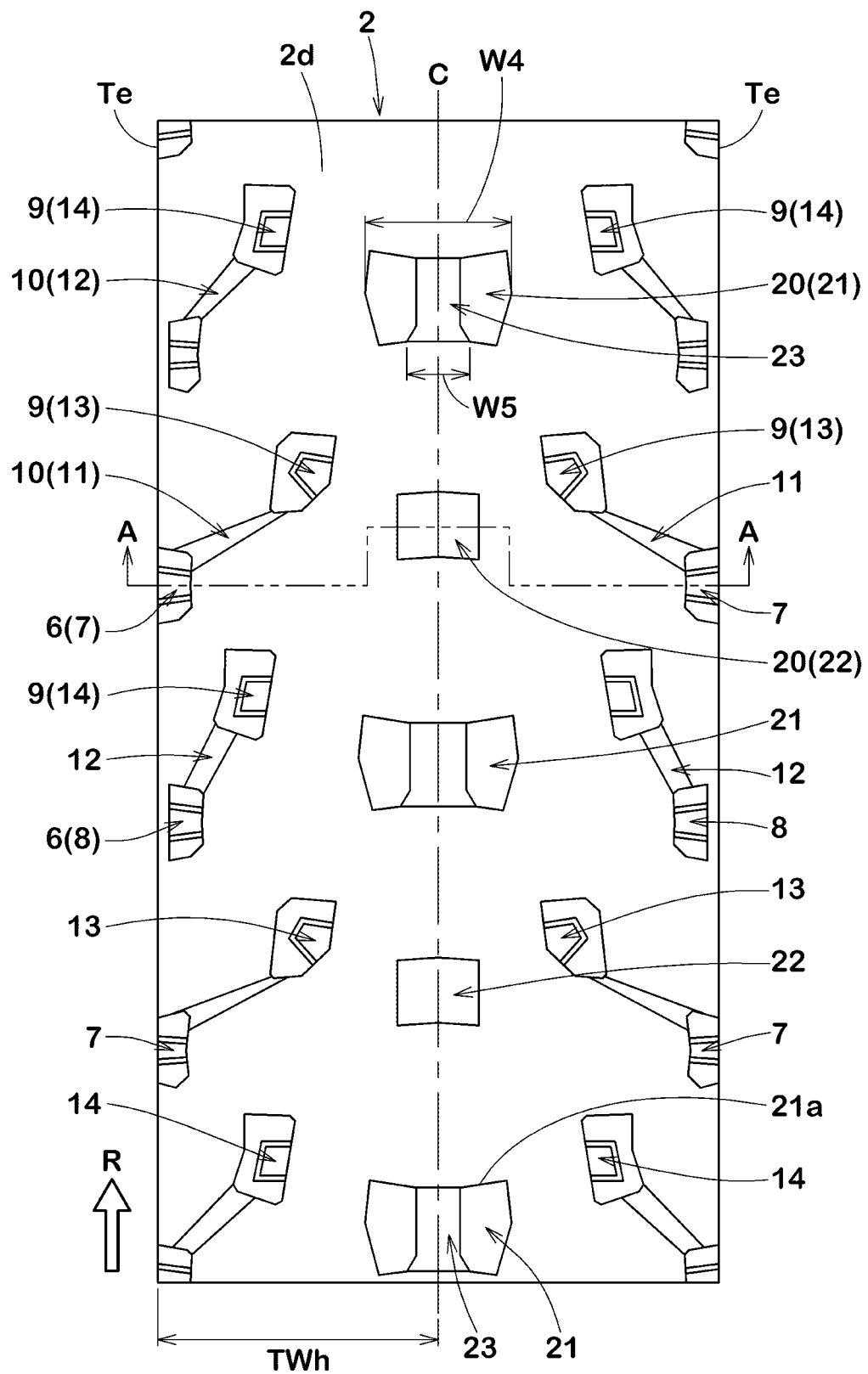
FIG. 2 is a development view of a tread portion of FIG. 1.

An embodiment of the present invention will now be described in conjunction with accompanying drawings. FIG. 1 is a lateral cross-sectional view of a tyre 1 for a motorcycle for rough terrain (hereinafter, may be simply referred to as "tyre 1") showing an embodiment of the present invention in a standard state. FIG. 2 is a development view showing a tread pattern of a tread portion 2 of the tyre 1. FIG. 1 is a cross-sectional view taken along A-A line of FIG. 2. The tyre 1 in this embodiment is for a motorcycle, for example, and is suitably used for motocross competition, for example. However, the tyre 1 of the present invention is not limited to such an embodiment.

The "standard state" is a state in which the tyre 1 is mounted on a standard rim, inflated to a standard inner pressure, and loaded with no tyre load. In this specification, dimensions and the like of various parts of the tyre 1 are those measured under the standard state, unless otherwise noted.

The "standard rim" is a wheel rim specified for the concerned tyre by a standard included in a standardization system on which the tyre is based, for example, the "normal wheel rim" in JATMA, "Design Rim" in TRA, and "Measuring Rim" in ETRTO.

The "standard inner pressure" is air pressure specified for the concerned tyre by a standard included in a standardization system on which the tyre is based, for example, the "maximum air pressure" in JATMA, maximum value listed in the "TIRE LOAD LIMITS AT VARIOUS COLD INFLATION PRESSURES" table in TRA, and "INFLATION PRESSURE" in ETRTO.

As shown in FIG. 1, an outer surface of the tread portion 2 of the tyre 1 in this embodiment, in a lateral cross sectional view thereof, is curved in an arc shape convex outwardly in a tyre radial direction.

The tyre 1 in this embodiment is provided with a carcass 4 and a belt layer 5, for example. Known configurations are appropriately used for these.

As shown in FIG. 2, the tread portion 2 has a directional pattern in which a rotational direction (R) is specified. The rotational direction (R) is indicated by a letter or a symbol on at least one of sidewall portions 3 (shown in FIG. 1).

The tread portion is provided with a plurality of middle blocks 9, a plurality of shoulder blocks 6, and tie bars 10 each connecting between one of the middle blocks 9 and its adjacent one of the shoulder blocks 6 at least in a region between one of tread edges (Te) and a tyre equator (c), for example. In this embodiment, the middle blocks 9, the shoulder blocks 6, and the tie bars 10 configured similarly are provided in the regions between the tyre equator (c) and both tread edges (Te). The tread edges (Te) are outer edges in a tyre axial direction of the blocks positioned outermost in the tyre axial direction among the blocks.

Figure 3:
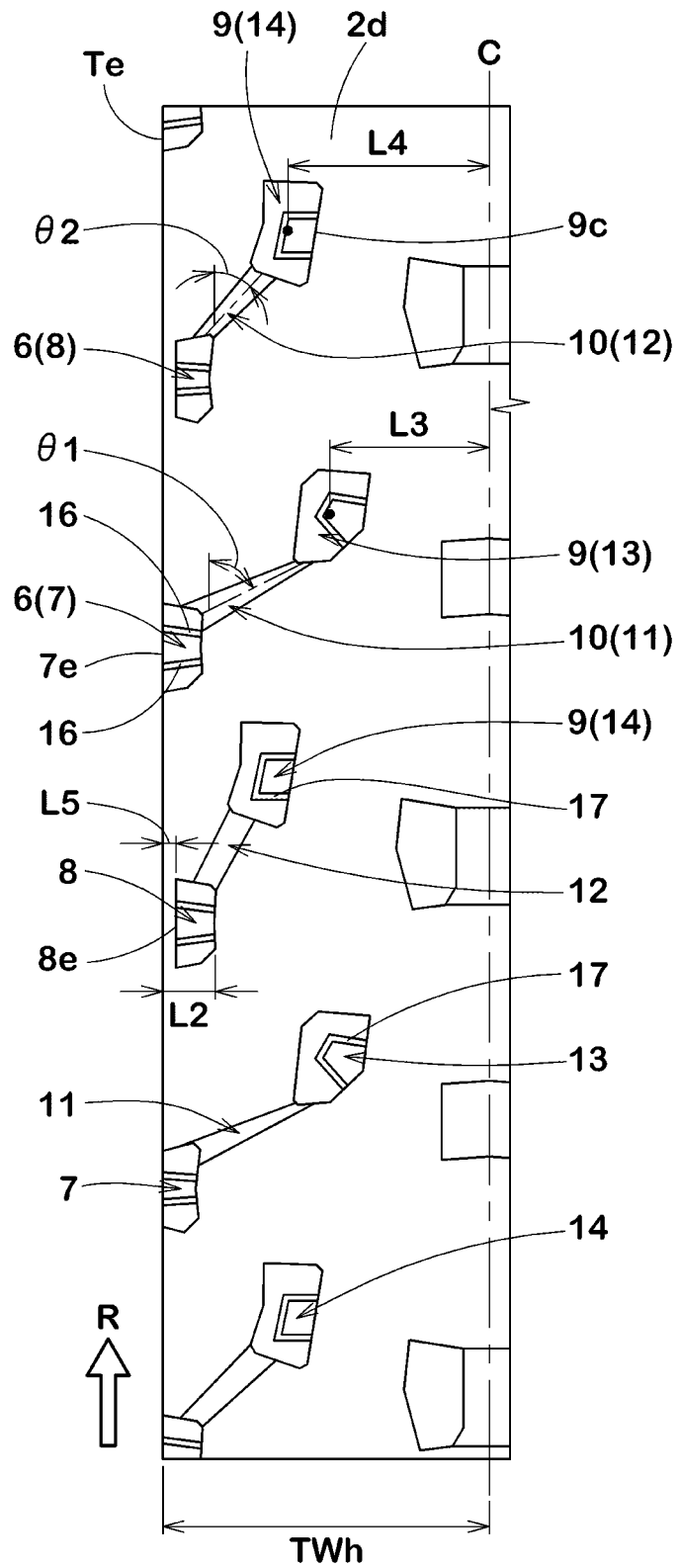
FIG. 3 is an enlarged view of middle blocks and shoulder blocks of FIG. 2.

FIG. 3 is an enlarged view of a plurality of the middle blocks 9 and a plurality of the shoulder blocks 6. As shown in FIG. 3, a plurality of the shoulder blocks 6 includes first shoulder blocks 7 and second shoulder blocks 8. Outer ends (7e) in the tyre axial direction of ground contacting surfaces of the first shoulder blocks 7 form tread edges (Te). A plurality of the first shoulder blocks 7 in this embodiment are arranged so that the outer ends thereof are at the same position in the tyre axial direction. An outer end (8e) in the tyre axial direction of the ground contacting surface of each of the second shoulder blocks 8 is positioned on an inner side in the tyre axial direction of one of the tread edges (Te) adjacent thereto.

It is preferred that an outer end displacement amount L5 is in the range of from 0.03 to 0.08 times a tread development half width (Twh), for example. The outer end displacement amount L5 is a distance between the outer end (7e) of one of the first shoulder blocks 7 and the outer end (8e) of one of the second shoulder blocks 8 adjacent thereto (the displacement amount along the outer surface of the tread portion 2. The same applies below). In a more preferred embodiment, it is preferred that the outer end displacement amount L5 is smaller than a width in the tyre axial direction of each of the shoulder blocks 6, for example. The tread development half width (TWh) corresponds to a distance in the tyre axial direction between the tyre equator (c) and one of the tread edges (Te) when the tread portion 2 is developed in a plane.

Each of the tie bars 10 is formed by partially raising a tread groove bottom surface (2d). A height of each of the tie bars 10 in this embodiment is not more than 0.5 times a maximum height of each of the middle blocks 9, for example, and more preferably it is not more than 0.3 times the maximum height of each of the middle blocks 9. The tie bars 10 include first tie bars 11 and second tie bars 12. Each of the first tie bars 11 connects between one of the middle blocks 9 and its adjacent one of the first shoulder blocks 7. Each of the second tie bars 12 connects between one of the middle blocks 9 and its adjacent one of the second shoulder blocks 8.

Each of the tie bars 10 configured as such increase the rigidity of the tread groove bottom surface (2d) between a respective one of the middle blocks 9 and a respective one of the shoulder blocks 6, therefore, it is possible that curvature (buckling) there is suppressed. Thereby, it becomes less likely that stress concentrates at the base of each of the blocks, therefore, the block durability is increased consequently.

Further, in the present invention, due to the above-described arrangement of the shoulder blocks 6, the first shoulder blocks 7 and the second shoulder blocks 8 contact the ground with a time difference during cornering operation in which the camber angle of the vehicle body increases. Thereby, it is possible that the tyre 1 in the present invention suppresses sudden change of the steering response fed back to the rider when the shoulder blocks 6 contact the ground, therefore, it is possible that excellent steering stability is exerted eventually.

In this embodiment, one tie bar 10 is connected with one middle block 9. In other words, each of the second tie bars 12 is connected with one of the middle blocks 9 with which any of the first tie bar 11 is not connected. Such an arrangement of the tie bars 10 is helpful for uniformly increasing the overall rigidity of the tread groove bottom surface (2d).

The first tie bars 11 and the second tie bars 12 are inclined with respect to the tyre axial direction, for example. The first tie bars 11 and the second tie bars 12 in this embodiment are inclined in the same direction. In a preferred embodiment, each of the first tie bars 11 and the second tie bars 12 is inclined toward a heel side in the rotational direction (R) as it goes from a side of a respective one of the tread edges (Te) to a side of the tyre equator (c). During running on rough terrain, the first tie bars 11 and the second tie bars 12 configured as such guide the soil and mud adhered to the tread groove bottom surface (2d) toward the tread edges (Te), therefore, it is possible that the soil and mud are positively discharged.

Each of the first tie bars 11 and the second tie bars 12 is inclined at an angle in the range of from 20 to 80 degrees with respect to a tyre circumferential direction, for example. Specifically, it is preferred that each of the first tie bars 11 is inclined at an angle $\theta 1$ in the range of from 50 to 80 degrees with respect to the tyre circumferential direction, for example. It is preferred that each of the second tie bars 12 is inclined at an angle $\theta 2$ in the range of from 20 to 50 degrees with respect to the tyre circumferential direction, for example.

In a further preferred embodiment, the angle $\theta 2$ of each of the second tie bars 12 is smaller than the angle $\theta 1$ of each of the first tie bars 11. Thereby, deformation in the tyre circumferential direction of the second shoulder blocks 8 is suppressed by the second tie bars 12, therefore, traction during cornering is increased.

Figure 4:
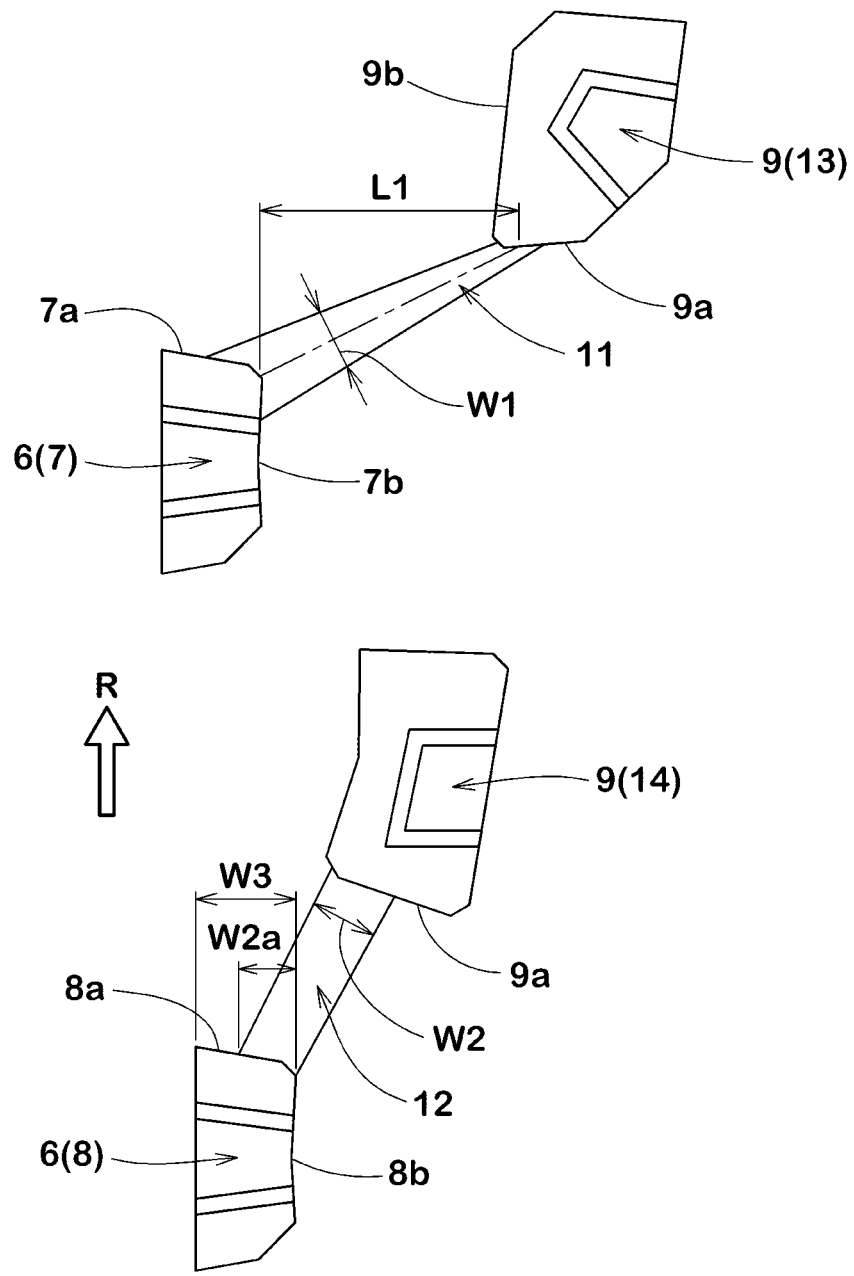
FIG. 4 is an enlarged view of one of first tie bars and one of second tie bars.

FIG. 4 is an enlarged view of one of the first tie bars 11 and one of the second tie bars 12. As shown in FIG. 4, each of the first tie bars 11 is connected with a block wall (9a) on a toe side in the rotational direction (R) or a block wall (9b) on a side of a respective one of the tread edges (Te) of a respective one of the middle blocks 9, for example. Each of the first tie bars 11 in this embodiment is connected with the block wall (9a) on the toe side. Each of the first tie bars 11 may be connected so as to include a corner portion formed by the block wall (9a) on the toe side and the block wall (9b) on the side of a respective one of the tread edges (Te).

Each of the first tie bars 11 is connected with a block wall (7a) on a heel side in the rotational direction (R) or a block wall (7b) on a side of the tyre equator (C) of a respective one of the first shoulder blocks 7, for example. Each of the first tie bars 11 in this embodiment is connected so as to include a corner portion formed by the block wall (7a) on the heel side and the block wall (7b) on the side of the tyre equator (C), for example.

It is preferred that a width W1 in a direction perpendicular to a length direction of at least one of the plurality of the first tie bars 11 gradually increases from the middle block 9 to the first shoulder block 7. The first tie bars 11 configured as such gradually increase the rigidity of the tread groove bottom surface (2d) toward a respective one of the tread edges (Te), therefore, it is possible that the sudden change of the steering response fed back to the rider is further suppressed eventually.

Each of the first tie bars 11 in this embodiment has the width gradually and smoothly increasing in the direction described above, therefore, it includes two straight edges each extending between the middle block 9 and the first shoulder block, for example. However, the width of each of the first tie bars 11 may gradually increase stepwise in the direction described above.

It is preferred that a length L1 in the tyre axial direction of each of the first tie bars 11 is larger than a width in the tyre axial direction of each of the middle blocks 9 and the shoulder blocks 6, for example. Specifically, it is preferred that the length L1 of each of the first tie bars 11 is in the range of from 0.25 to 0.35 times the tread development half width (Twh) (shown in FIG. 2), for example.

As shown in FIG. 4, each of the second tie bars 12 is connected with the block wall (9a) on the toe side in the rotational direction (R) or the block wall (9b) on the side of a respective one of the tread edges (Te) of a respective one of the middle blocks 9, for example. Each of the second tie bars 12 in this embodiment is connected with the block wall (9a) on the toe side. Each of the second tie bars 12 may be connected so as to include the corner portion formed by the block wall (9a) on the toe side and the block wall (9b) on the side of a respective one of the tread edges (Te).

Each of the second tie bars 12 is connected with a block wall (8a) on the heel side in the rotational direction (R) of a respective one of the second shoulder blocks 8, for example. Each of the second tie bars 12 may be connected with a block wall (8b) on the side of the tyre equator (c) of a respective one of the second shoulder blocks 8 or may be connected so as to include a corner portion formed by the block wall (8b) and the block wall (8a) on the heel side in the rotational direction (R), for example.

It is preferred that a width W2 in a direction perpendicular to a length direction of at least one of the plurality of the second tie bars 12 gradually decreases from the middle block 9 to the second shoulder blocks 8. The second tie bars 12 configured as such moderately increase deformation amount during running on rough terrain in the vicinity of the second shoulder blocks 8, therefore, it is possible that the soil and mud is suppressed from being kept in the tread groove bottom surface (2d).

The width of each of the second tie bars 12 in this embodiment smoothly and gradually decreases in the direction described above, therefore, it includes two straight edges each extending between the middle block 9 and the second shoulder block 8, for example. However, the width of each of the second tie bars 12 may gradually increase stepwise in the direction described above.

It is preferred that a width of a connecting portion of each of the second tie bars 12 in this embodiment with a respective one of the middle blocks 9 is larger than a width of a connecting portion of each of the first tie bars 11 with a respective one of the middle blocks 9, for example. Thereby, the deformation amount of the tread groove bottom surface (2d) during running on rough terrain is different in the vicinity of the first tie bars 11 and in the vicinity of the second tie bars 12. Thereby, it is made easy for the soil and mud to be discharged from the tread groove bottom surface (2d) during running on rough terrain.

It is preferred that a width (w2a) of a connecting portion of each of the second tie bars 12 with a respective one of the second shoulder blocks 8 is in the range of from 0.30 to 0.70 times a width W3 in the tyre axial direction of the block wall of a respective one of the second shoulder blocks 8 with which the concerned second tie bar 12 is connected.

As shown in FIG. 3, the first shoulder blocks 7 and the second shoulder blocks in this embodiment are arranged alternately in the tyre circumferential direction at least partially. Thereby, the first tie bars 11 and the second tie bars 12 are arranged alternately in the tyre circumferential direction. Such an arrangement of the tie bars 10 is helpful for uniformly increasing the overall rigidity of the tread groove bottom surface (2d).

It is preferred that the shoulder blocks 6 are arranged in a region within one third of the tread development half width (Twh) from at least one of the tread edges (Te). In a further preferred embodiment, it is preferred that a distance L2 between an inner end in the tyre axial direction of each of the shoulder blocks 6 and its adjacent one of the tread edges (Te) is not more than 0.18 times the tread development half width (Twh). Thereby, each of the shoulder blocks 6 exerts large reaction force in the tyre axial direction in the vicinity of the maximum camber angle, therefore, excellent cornering characteristics are eventually obtained.

Each of the shoulder blocks 6 in this embodiment is provided with one or a plurality of shoulder sipes 16 each extending in the tyre axial direction so as to completely cross the block, for example. Each of the shoulder blocks 6 in this embodiment is provided with two shoulder sipes 16. Note that, in this specification, the term "sipe" means a cut or a groove whose width is less than 1.5 mm.

In a preferred embodiment, it is preferred that a space in the tyre circumferential direction between the two shoulder sipes 16 gradually increases toward the tread edge (Te). Such an arrangement of the shoulder sipes 16 maintains the rigidity of the shoulder blocks 6 on the side of a respective one of the tread edges (Te), therefore, they are helpful for exerting excellent steering stability during cornering in which the tread edges (Te) contact the ground.

The middle blocks 9 include first middle blocks 13 each connected with a respective one of the first tie bars 11 and the second middle blocks 14 each connected with a respective one of the second tie bars 12, for example. The first middle blocks 13 are arranged on a side of the tyre equator (c) of the second middle blocks 14, for example. More specifically, a centroid of the ground contacting surface of each of the first middle blocks 13 is located closer to the tyre equator (C) than the centroid of the ground contacting surface of each of the second middle blocks 14. Further, the first middle blocks 13 and the second middle blocks 14 in this embodiment are arranged alternately in the tyre circumferential direction.

It is preferred that each of the first middle blocks 13 overlaps with at least one of the second middle blocks 14 in the tyre axial direction. It is preferred that a distance L3 in the tyre axial direction between the tyre equator (c) and the centroid of each of the first middle blocks 13 is in the range of from 0.40 to 0.55 times the tread development half width (Twh), for example. It is preferred that a distance L4 in the tyre axial direction between the tyre equator (c) and the centroid of each of the second middle blocks 14 is in the range of from 0.60 to 0.80 times the tread development half width (Twh), for example.

It is preferred that each of the middle blocks 9 is provided with a middle sipe 17 bent in a U-shape, for example. Both ends of the middle sipe 17 in this embodiment are connected with a block wall (9c) on the side of the tyre equator (C) of a respective one of the middle blocks 9, for example. The middle sipe 17 configured as such maintains the rigidity on the side of the tread edge (Te), while providing frictional force in multiple directions, therefore, it is helpful for exerting excellent steering stability.

As shown in FIG. 2, it is preferred that the tread portion 2 is provided with a plurality of crown blocks 20 in a center portion thereof in the tyre axial direction. It is preferred that the centroid of the ground contacting surface of each of the crown blocks 20 in this embodiment is arranged within a region having a width of 0.60 times the tread development half width (Twh) with the tyre equator (C) in the center. In a preferred embodiment, the entire crown blocks are arranged in the region described above.

The crown blocks 20 include first crown blocks 21 and second crown blocks 22 having different shapes, for example. The first crown blocks 21 and the second crown blocks 22 in this embodiment are arranged alternately in the tyre circumferential direction.

It is preferred that a block wall (21a) on the heel side in the rotational direction (R) of each of the first crown blocks 21 concave toward the toe side in the rotational direction (R), for example. It is possible that the first crown blocks 21 configured as such increase the traction during running on rough terrain.

It is preferred that each of the first crown blocks 21 is provided with a wide portion 23 at a center portion thereof in the tyre axial direction, for example. It is preferred that a maximum width W5 in the tyre axial direction of the wide portion 23 is in the range of from 0.30 to 0.50 times a maximum width W4 in the tyre axial direction of a respective one of the first crown blocks 21.

It is preferred that a width of the wide portion 23 gradually decreases toward the toe side in the rotational direction (R), for example. It is possible that the wide portion 23 configured as such moderately releases the soil caught by the block wall (21a) to the toe side in the rotational direction (R), therefore, it is possible that the mud is suppressed from being kept in the tread groove bottom surface.

Each of the second crown blocks 22 has a length in the tyre circumferential direction and a length in the tyre axial direction smaller than those of each of the first crown blocks 21, for example. It is easy for the second crown blocks 22 configured as such to stick themselves in the road surface, therefore, it is possible that the traction is increased on relatively hard rough terrain.

While detailed description has been made of the tyre for a motorcycle for rough terrain as an embodiment of the present invention, the present invention can be embodied in various forms without being limited to the illustrated embodiment.

Working Examples (Examples)

Figure 5:
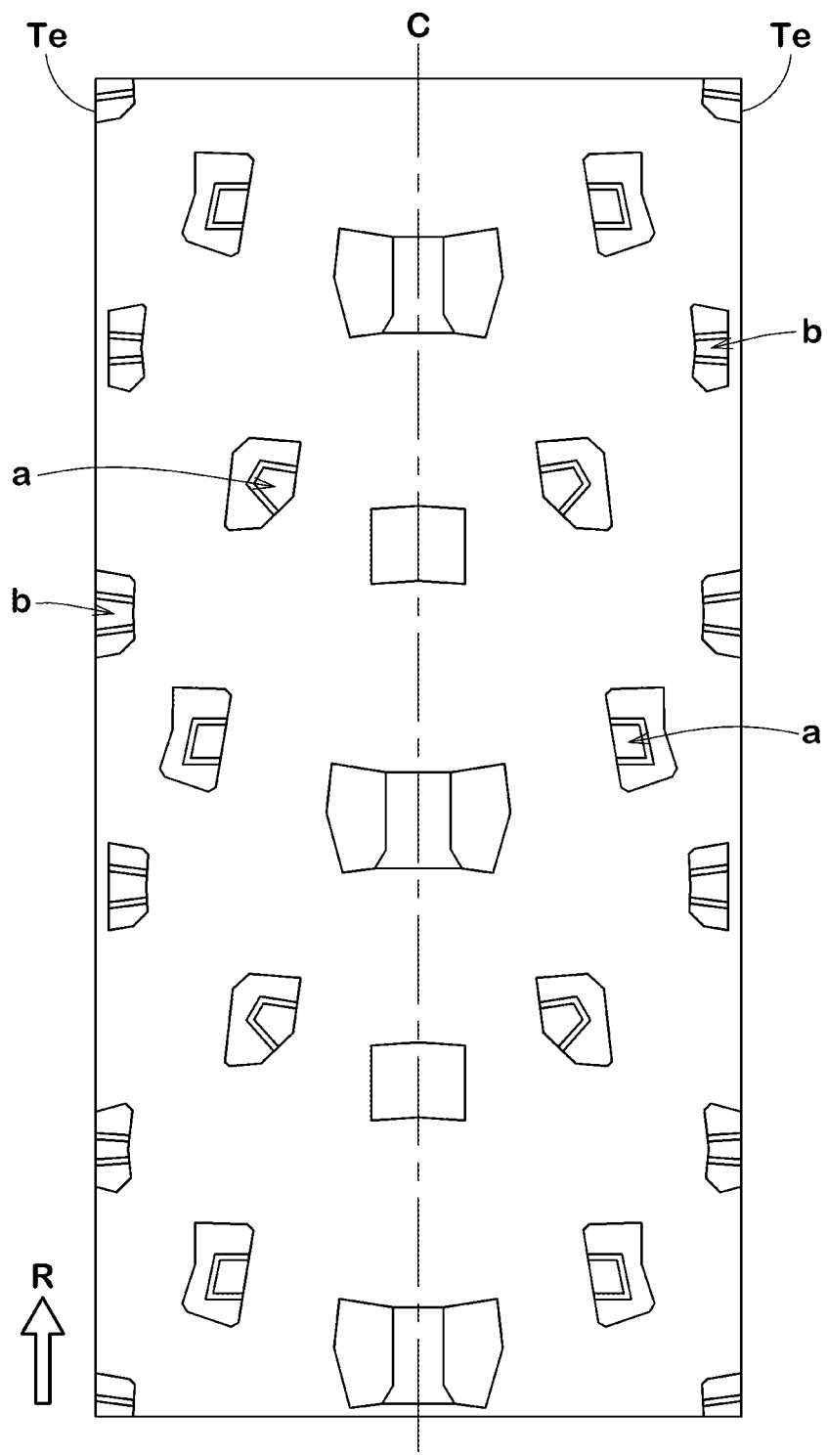
FIG. 5 is a development view of the tread portion of Reference 1.
Figure 6:
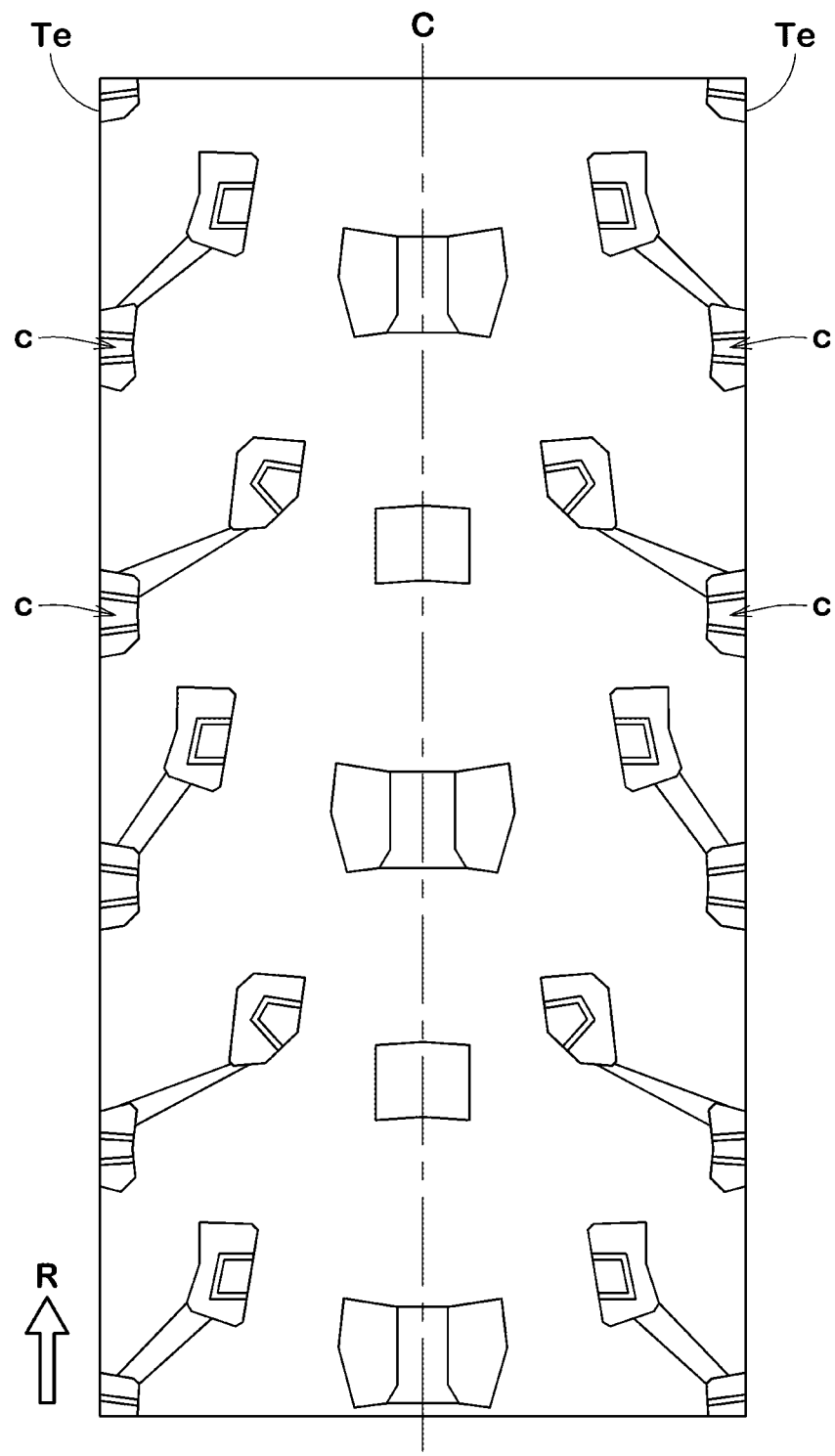
FIG. 6 is a development view of the tread portion of Reference 2.

Tyres for a motorcycle for rough terrain to be mounted on a rear wheel each having the tread pattern shown in FIG. 1 were made by way of test according to the specifications listed in Table 1. As Reference 1, as shown in FIG. 5, a tyre in which tie bars are not provided between middle blocks (a) and shoulder blocks (b) was made by way of test. The tyre of FIG. 5 was substantially the same as the tyre of FIG. 1 except for the configuration described above. As Reference 2, as shown in FIG. 6, a tyre in which each of shoulder blocks (c) forms either one of the tread edges (Te) was made by way of test. The tyre of FIG. 6 was substantially the same as the tyre of FIG. 1 except for the configuration described above. Each of the test tyres was tested for the block durability and the steering stability. Common specifications of the test tyres and the test methods were as follows.

Tyre size: 120/80-19

Rim size: 2.10×19

Tyre inner pressure: 80 kPa

Test vehicle: Motorcycle for motocross competition with displacement of 450 cc

<Block Durability>

Each of the test tyres was run on a drum having a diameter of 1.7 meters at a speed of 50 km/h and loaded with a longitudinal load of 1.95 kN so that the middle blocks and the shoulder blocks thereof were in contact with the drum surface, and then the running distance until tearing-off of the block occurred was measured. The test results are indicated as an index based on the Reference 1 being 100 wherein the larger the numerical value, the better the block durability is.

<Steering Stability> while a test rider drove the test vehicle described above on rough terrain, the steering stability was evaluated by the test rider's feeling. The test results are indicated as an evaluation point based on the Reference 1 being 100 wherein the larger the numerical value, the better the steering stability is.

The test results are shown in Table 1.

TABLE 1

|  | Ref. 1 | Ref. 2 | Ex. 1 | Ex. 2 | Ex. 3 | Ex. 4 | Ex. 5 | Ex. 6 |
| --- | --- | --- | --- | --- | --- | --- | --- | --- |
| Figure showing Tread pattern | FIG. 5 | FIG. 6 | FIG. 1 | FIG. 1 | FIG. 1 | FIG. 1 | FIG. 1 | FIG. 1 |
| Angle θ1 of First tie bar [degree] | — | 60-70 | 60-70 | 50-60 | 55-65 | 65-75 | 70-80 | 60-70 |

TABLE 1-continued

| | | | | | | | | |
|---|---|---|---|---|---|---|---|---|
| Angle θ2 of Second tie bar [degree] | — | 30-45 | 30-45 | 20-35 | 25-40 | 35-50 | 40-55 | 30-45 |
| Height of Tie bar/ Height of Middle block | — | 0.12 | 0.12 | 0.12 | 0.12 | 0.12 | 0.12 | 0.05 |
| Width (W2a) of Second tie bar/ Width (W3) of Block wall | — | 0.50 | 0.50 | 0.50 | 0.50 | 0.50 | 0.50 | 0.50 |
| Outer end displacement amount (L5)/ Tread development half width (TWh) | 0.05 | — | 0.05 | 0.05 | 0.05 | 0.05 | 0.05 | 0.05 |
| Block durability [index] | 100 | 105 | 106 | 104 | 105 | 107 | 108 | 104 |
| Steering stability [evaluation point] | 100 | 97 | 107 | 108 | 107 | 105 | 103 | 106 |

| | Ex. 7 | Ex. 8 | Ex. 9 | Ex. 10 | Ex. 11 | Ex. 12 | Ex. 13 | Ex. 14 | Ex. 15 |
|---|---|---|---|---|---|---|---|---|---|
| Figure showing Tread pattern | FIG. 1 | FIG. 1 | FIG. 1 | FIG. 1 | FIG. 1 | FIG. 1 | FIG. 1 | FIG. 1 | FIG. 1 |
| Angle θ1 of First tie bar [degree] | 60-70 | 60-70 | 60-70 | 60-70 | 60-70 | 60-70 | 60-70 | 60-70 | 60-70 |
| Angle θ2 of Second tie bar [degree] | 30-45 | 30-45 | 30-45 | 30-45 | 30-45 | 30-45 | 30-45 | 30-45 | 30-45 |
| Height of Tie bar/ Height of Middle block | 0.20 | 0.30 | 0.50 | 0.12 | 0.12 | 0.12 | 0.12 | 0.12 | 0.12 |
| Width (W2a) of Second tie bar/ Width (W3) of Block wall | 0.50 | 0.50 | 0.50 | 0.30 | 0.40 | 0.60 | 0.70 | 0.50 | 0.50 |
| Outer end displacement amount (L5)/ Tread development half width (TWh) | 0.05 | 0.05 | 0.05 | 0.05 | 0.05 | 0.05 | 0.05 | 0.03 | 0.08 |
| Block durability [index] | 106 | 106 | 107 | 104 | 106 | 106 | 107 | 106 | 104 |
| Steering stability [evaluation point] | 107 | 106 | 104 | 107 | 107 | 106 | 104 | 104 | 107 |

From the test results, it was confirmed that the block durability and the steering stability were improved for the tyres as Examples.

The invention claimed is:

1. A tyre for a motorcycle for rough terrain comprising a tread portion, wherein
in a region between at least one of tread edges of the tread portion and a tyre equator, the tread portion is provided with a plurality of middle blocks arranged between the tyre equator and the one of the tread edges, a plurality of shoulder blocks arranged on an outer side in a tyre axial direction of the middle blocks, and tie bars each connecting between one of the middle blocks and its adjacent one of the shoulder blocks,
the plurality of the shoulder blocks consists of first shoulder blocks whose outer ends in the tyre axial direction of ground contacting surfaces thereof form the one of the tread edges and second shoulder blocks whose outer ends in the tyre axial direction of ground contacting surfaces thereof arranged on an inner side in the tyre axial direction of the one of the tread edges,
the tie bars consist of first tie bars each connecting between one of the middle blocks and its adjacent one of the first shoulder blocks and second tie bars each connecting between one of the middle blocks and its adjacent one of the second shoulder blocks, and
the first tie bars and the second tie bars are arranged alternately one by one in a tyre circumferential direction.

2. The tyre for a motorcycle for rough terrain according to claim 1, wherein
each of the second tie bars is connected with one of the middle blocks with which any of the first tie bars is not connected.

3. The tyre for a motorcycle for rough terrain according to claim 1, wherein
the tread portion is bound with an intended tyre rotational direction, and
each of the first tie bars and the second tie bars is inclined toward a heel side in the tyre rotational direction as it goes from a side of the one of the tread edges to a side of the tyre equator.

4. The tyre for a motorcycle for rough terrain according to claim 3, wherein
each of the first tie bars and the second tie bars is inclined at an angle in a range of from 20 to 80 degrees with respect to a tyre circumferential direction.

5. The tyre for a motorcycle for rough terrain according to claim 4, wherein
the angle of each of the second tie bars is smaller than the angle of each of the first tie bars.

6. The tyre for a motorcycle for rough terrain according to claim 1, wherein
the tread portion is provided with a plurality of the first tie bars,
in at least one of the plurality of the first tie bars, a width in a direction perpendicular to a longitudinal direction thereof gradually increases from one of the middle blocks connected therewith to one of the first shoulder blocks connected therewith, and
the tread portion is provided with a plurality of the second tie bars, and
in at least one of the plurality of the second tie bars, a width in a direction perpendicular to a longitudinal direction thereof gradually decreases from one of the middle blocks connected therewith to one of the second shoulder blocks connected therewith.

7. The tyre for a motorcycle for rough terrain according to claim 1, wherein
a height of each of the tie bars is not more than 0.5 times a maximum height of each of the middle blocks.

8. The tyre for a motorcycle for rough terrain according to claim 1, wherein
each of the first tie bars and the second tie bars has a connecting portion with a respective one of the middle blocks, and
a width of the connecting portion of each of the second tie bars is larger than a width of the connecting portion of each of the first tie bars.

9. The tyre for a motorcycle for rough terrain according to claim 1, wherein
the tread portion is bound with an intended tyre rotational direction, and
each of the second tie bars is connected with a block wall on a heel side in the tyre rotational direction of a respective one of the second shoulder blocks.

10. The tyre for a motorcycle for rough terrain according to claim 9, wherein a width of a connecting portion of each of the second tie bars with a respective one of the second shoulder blocks is in a range of from 0.30 to 0.70 times a width in the tyre axial direction of the block wall of a respective one of the second shoulder blocks.

11. The tyre for a motorcycle for rough terrain according to claim 1, wherein each of the first and second tie bars connects one middle block and one shoulder block on a one-to-one basis.

12. The tyre for a motorcycle for rough terrain according to claim 3, wherein all of the first and second tie bars are inclined to the heel side from the tread edges to the tyre equator.

13. The tyre for a motorcycle for rough terrain according to claim 11, wherein
all shoulder blocks are connected with the middle blocks by the first or second tie bars,
the tread block includes groups each consisting of one first or second tie bar, one shoulder block and one middle block connected by the one first or second tie bar, and
the groups are spaced apart from each other without being connected with other tie bars and arranged in the tyre circumferential direction.

14. The tyre for a motorcycle for rough terrain according to claim 1, wherein
an outer end displacement amount is in the range of from 0.03 to 0.08 times a tread development half width, and
the outer end displacement amount is a distance between an axially outer end of one of the first shoulder blocks and an axially outer end of one of the second shoulder blocks adjacent thereto.

15. The tyre for a motorcycle for rough terrain according to claim 14, wherein
the outer end displacement amount is smaller than a width in the tyre axial direction of each of the shoulder blocks.

16. The tyre for a motorcycle for rough terrain according to claim 1, wherein each of the shoulder blocks is provided with one or more shoulder sipes each extending in the tyre axial direction so as to completely cross the shoulder block.

17. The tyre for a motorcycle for rough terrain according to claim 16, wherein
each of the shoulder blocks is provided with two shoulder sipes, and
a space in the tyre circumferential direction between the two shoulder sipes gradually and continuously increases toward a respective one of the tread edges.

18. The tyre for a motorcycle for rough terrain according to claim 1, wherein
each of the first tie bars is connected with a block wall on a toe side in the rotational direction or a block wall on a side of a respective one of the tread edges of a respective one of the middle blocks, and
each of the first tie bars is connected with a block wall on a heel side in the rotational direction or a block wall on a side of the tyre equator of a respective one of the first shoulder blocks.

19. The tyre for a motorcycle for rough terrain according to claim 1, wherein a length in the tyre axial direction of each of the first tie bars is larger than a width in the tyre axial direction of each of the middle blocks and the shoulder blocks.

20. The tyre for a motorcycle for rough terrain according to claim 9, wherein each of the second tie bars is connected with a block wall on a toe side in the rotational direction or a block wall on a side of a respective one of the tread edges of a respective one of the middle blocks.

* * * * *